United States Patent
White

(10) Patent No.: US 7,264,895 B2
(45) Date of Patent: Sep. 4, 2007

(54) FUEL CELL THERMAL MANAGEMENT SYSTEM

(75) Inventor: Eric T. White, Guilderland Center, NY (US)

(73) Assignee: Plug Power Inc., Latham, NY (US)

( * ) Notice: Subject to any disclaimer, the term of this patent is extended or adjusted under 35 U.S.C. 154(b) by 596 days.

(21) Appl. No.: 10/265,025

(22) Filed: Oct. 4, 2002

(65) Prior Publication Data
US 2003/0087139 A1 May 8, 2003

Related U.S. Application Data

(60) Provisional application No. 60/336,447, filed on Oct. 31, 2001.

(51) Int. Cl.
*H01M 8/04* (2006.01)
(52) U.S. Cl. .......................... 429/24; 429/26
(58) Field of Classification Search ............... None
See application file for complete search history.

(56) References Cited

U.S. PATENT DOCUMENTS 6,797,421 B2 * 9/2004 Assarabowski et al. ....... 429/26

2003/0039873 A1 * 2/2003 Condit et al. ................. 429/26

* cited by examiner

*Primary Examiner*—Jonathan Crepeau
(74) *Attorney, Agent, or Firm*—Trop, Pruner & Hu, P.C.

(57) ABSTRACT

The invention provides fuel cell systems and methods of operation where a fuel cell system is used as a backup power supply in a cold environment where the system must be maintained at a suitable temperature to allow the fuel cell to operate when needed. In one embodiment, the invention provides a thermal protection system for a fuel cell backup power generator. An enclosure houses a fuel cell and a coolant circuit. The coolant circuit is coupled to the fuel cell. A temperature sensor is provided that is adapted to indicate a system temperature. A heater is provided to increase the system temperature when actuated. For example, the heater can be an electric resistive heater or a burner coupled to a combustible fuel supply such as a propane tank. The heater can be located in the interior of the enclosure, in the coolant circuit, etc. A control circuit is provided that is adapted to actuate the heater when the system temperature is below a predetermined threshold.

21 Claims, 4 Drawing Sheets

FUEL CELL THERMAL MANAGEMENT SYSTEM

CROSS REFERENCE TO RELATED APPLICATIONS

This application claims priority under 35 USC 119(e) from U.S. Provisional Application No. 60/336,447, filed Oct. 31, 2001, naming White as inventor, and titled "FUEL CELL THERMAL MANAGEMENT SYSTEM." That application is incorporated herein by reference in its entirety and for all purposes.

BACKGROUND

The invention relates to systems and associated method of operation relating to thermally protected fuel cell backup power supplies.

A fuel cell is an electrochemical device that converts chemical energy produced by a reaction directly into electrical energy. For example, one type of fuel cell includes a polymer electrolyte membrane (PEM), often called a proton exchange membrane, that permits only protons to pass between an anode and a cathode of the fuel cell. At the anode, diatomic hydrogen (a fuel) is reacted to produce protons that pass through the PEM. The electrons produced by this reaction travel through circuitry that is external to the fuel cell to form an electrical current. At the cathode, oxygen is reduced and reacts with the protons to form water. The anodic and cathodic reactions are described by the following equations:

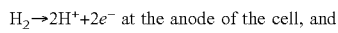

$H_2 \rightarrow 2H^+ + 2e^-$ at the anode of the cell, and

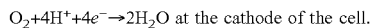

$O_2 + 4H^+ + 4e^- \rightarrow 2H_2O$ at the cathode of the cell.

A typical fuel cell has a terminal voltage of up to about one volt DC. For purposes of producing much larger voltages, multiple fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow field plates (graphite composite or metal plates, as examples) that are stacked one on top of the other. The plates may include various surface flow field channels and orifices to, as examples, route the reactants and products through the fuel cell stack. A PEM is sandwiched between each anode and cathode flow field plate. Electrically conductive gas diffusion layers (GDLs) may be located on each side of each PEM to act as a gas diffusion media and in some cases to provide a support for the fuel cell catalysts. In this manner, reactant gases from each side of the PEM may pass along the flow field channels and diffuse through the GDLs to reach the PEM. The PEM and its adjacent pair of catalyst layers are often referred to as a membrane electrode assembly (MEA). An MEA sandwiched by adjacent GDL layers is often referred to as a membrane electrode unit (MEU).

Suitable fuel cell components are well known in the art. As examples, common membrane materials include Nafion™, Gore Select™, sulphonated fluorocarbon polymers, and other materials such as polybenzimidazole and polyether ether ketone. Various suitable catalyst formulations are also known in the art, and are generally platinum-based. The GDL's generally comprise either a paper or cloth based on carbon fibers. The flow field plates are generally molded, stamped or machined from materials including carbon composites, plastics and metal alloys. The plates may include various surface flow channels and orifices to, as examples, route the reactants and products through the fuel cell stack. Reactant gases from each side of the PEM may pass along the flow channels and diffuse through the GDLs to reach the PEM.

Some fuel cell systems may be characterized as "dead headed". Operation of a dead headed hydrogen fuel cell has typically occurred as follows: Hydrogen is input to the stack at the anode inlet. The anode outlet is dead-ended with a purge valve. During operation, hydrogen enters the anode side of the fuel cell, passes through the membrane as load is applied, and reacts with oxygen on the cathode side, forming water. Some amount of water may back diffuse from the cathode side to the anode side. Nitrogen may also diffuse to the anode side. Factors such as the increased amount of nitrogen and water diffusion eventually cause cell performance to drop, and when this occurs a purge valve is triggered to open and close.

A fuel cell system may include a fuel processor that converts a hydrocarbon (natural gas or propane, as examples) into a fuel flow for the fuel cell stack. For a given output power of the fuel cell stack, the fuel flow to the stack must satisfy the appropriate stoichiometric ratios governed by the equations listed above. Thus, a controller of the fuel cell system may monitor the output power of the stack and based on the monitored output power, estimate the fuel flow to satisfy the appropriate stoichiometric ratios. In this manner, the controller regulates the fuel processor to produce this flow, and in response to the controller detecting a change in the output power, the controller estimates a new rate of fuel flow and controls the fuel processor accordingly. One "stoich" of fuel flow is defined as the amount theoretically needed to satisfy a given load on the fuel cell, assuming all of the reactant is reacted in the fuel cell.

The fuel cell system may provide power to a load, such as a load that is formed from residential appliances and electrical devices that may be selectively turned on and off, causing the power that is demanded by the load to vary. Thus, the load may not be constant, but rather the power that is consumed by the load may vary over time and abruptly change in steps. For example, if the fuel cell system provides power to a house, different appliances/electrical devices of the house may be turned on and off at different times to cause the load to vary in a stepwise fashion over time. Fuel cell systems adapted to accommodate variable loads are sometimes referred to as "load following" systems.

Fuel cells generally operate at temperatures much higher than ambient (e.g., 50-80° C. or 120-180° C.), and the fuel and air streams circulated through the fuel cells typically include water vapor. For example, reactants associated with sulphonated fluorocarbon polymer membranes must generally be humidified to ensure the membranes remain moist during operation. In such a system, water may condense out of a process stream where the stream is cooled below its dew point. For example, if the anode and cathode exhaust streams are saturated with water vapor at the stack operating temperature, water will tend to condense from these streams as they cool after leaving the stack. Similarly, the humidity and temperature conditions of other process streams may also produce condensation. It may be desirable to remove condensate from a process stream in a fuel cell system process stream. As examples, such condensate can interfere with the flow of process streams, can potentially build to levels that can flood portions of the system, and can also cause problems if allowed to freeze (e.g., in an outdoor unit that is not in service).

There is a continuing need for fuel cell systems and associated methods of operating fuel cell systems to achieve new and approved applications while accommodating design considerations including the forgoing in a robust, cost-effective manner.

SUMMARY

The invention provides fuel cell systems and methods of operation where a fuel cell system is used as a backup power supply in a cold environment where the system must be maintained at a suitable temperature to allow the fuel cell to operate when needed. Such systems are sometimes referred to as thermally protected systems.

In one aspect, the invention provides a thermal protection system for a fuel cell backup power generator. An enclosure houses a fuel cell and a coolant circuit. The coolant circuit is coupled to the fuel cell. A temperature sensor is provided that is adapted to indicate a system temperature. As examples, the system temperature can refer to the temperature of a component in the system such as the interior atmosphere of the enclosure, the fuel cell assembly, etc. A heater is provided to increase the system temperature when actuated. For example, the heater can be an electric resistive heater or a burner coupled to a combustible fuel supply such as a propane tank. As examples, the heater can be located in the interior of the enclosure, in the coolant circuit, etc. A control circuit is provided that is adapted to actuate the heater when the system temperature is below a predetermined threshold (e.g., 0-15° C.).

The fuel cell is preferably a PEM fuel cell, though other types of fuel cells needing thermal protection can also be used. The coolant is generally a dielectric fluid having a freezing temperature below the freezing temperature of water. However, water can also be used (e.g., de-ionized water). In some embodiments, the primary power supply that the fuel cell system is backing up is used to power a resistive heater in the system to keep the system ready for operation. As an example, the primary power supply can be a utility power grid.

In some embodiments, the control circuit can be a simple thermostat, whereas in other embodiments, the controller can include more sophisticated circuitry such as a programmable circuit coupled to a network of sensors, PID controllers, etc Generally, a portion of the control circuitry used to operate the fuel cell system is used to operate the thermal protection system of the present invention while the system is in the dormant state (e.g., not supplying current to the electrical load being supplied by the primary power supply).

In some embodiments, a pump is also used during the dormant state to circulate coolant through the system to keep the system at a suitable temperature to allow the system to operate when needed. In some cases, the pump can be powered by the primary power supply.

In another aspect, a method is provided for regulating the temperature of a dormant fuel cell backup power supply, including the following steps: (1) coupling a fuel cell system to a load and a primary power supply, wherein the fuel cell system is adapted to supply power to the load upon a failure of the primary power supply; (2) measuring a temperature of the fuel cell system to generate a temperature signal; (3) communicating the temperature signal to a control circuit; (4) determining whether the temperature is below a predetermined threshold; and (5) actuating a heater when the temperature is below the predetermined threshold (e.g., 0 to 15° C.). In some embodiments, an alternate step (5) may be used that includes flowing a heat transfer fluid through a portion of the system to raise the temperature when the temperature is below the predetermined threshold, wherein the backup power supply is located outside a building, and wherein the heat transfer fluid is circulated between the building and the backup power supply. For example, the system can be used to provide backup power to a building, and hot water from a hot water tank in the building can be circulated through the system when needed to keep it warm.

Some embodiments may further include actuating a pump to circulate a heat transfer fluid through the fuel cell system when the temperature is below the predetermined threshold. In some embodiments, a temperature sensor located in an atmosphere of the fuel cell system is used to generate the temperature signal. In other embodiments, a temperature sensor located in a coolant circuit of the fuel cell system is used to generate the temperature signal.

Additional embodiments of the invention can also include any of the other features or techniques described herein, either alone or in combination. Advantages and other features of the invention will become apparent from the following description, drawings and claims.

DETAILED DESCRIPTION

A fuel cell system is contemplated which provides backup power to a load, which has lost its primary power source (i.e. the grid). In some cases the fuel cell system may be located in remote locations having widely varying temperatures. Such a back up power system would require the fuel cell portion of the system to start up and provide power in a timely manner. In locations which experience low temperatures at or below freezing, start up time may be increased due to the time it takes the fuel cell system to "warm up" or come up to the operating temperature.

Figure 1:
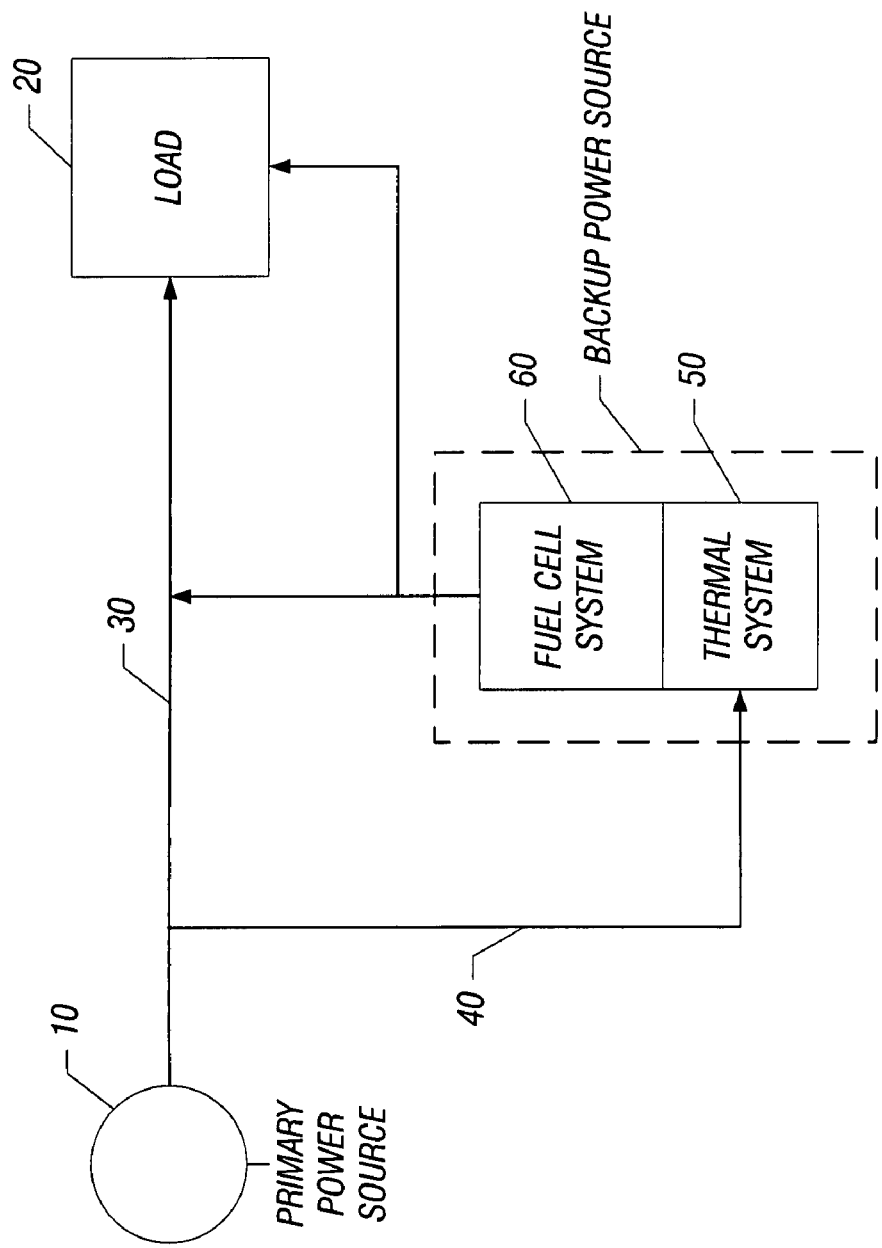
FIG. 1 is a schematic diagram of an embodiment of a system including a fuel cell.

The present invention contemplates a back up power system having a fuel cell as the power generation source, which utilizes power from the primary power source (e.g. the grid) to power a thermal regulation system which maintains the fuel cell system at an acceptable temperature. As shown in FIG. 1, the primary power source 10 supplies power to a load 20 via power line 30. Primary power source 10 may be an electrical power grid or another power generation device such as a generator and may supply either AC or DC power to load 20. Power line 40 connects primary power source 10 to thermal regulating system 50 to maintain a desired temperature with fuel cell system 60. In some cases the primary and/or backup power source may provide AC power, and the load and/or thermal regulating system may require DC power. In such cases an AC to DC converter may be utilized where necessary to provide the required type of power. Similarly the primary and/or backup power source may provide DC power where AC power is required, in such cases a DC to AC power converter may be utilized.

Figure 2:
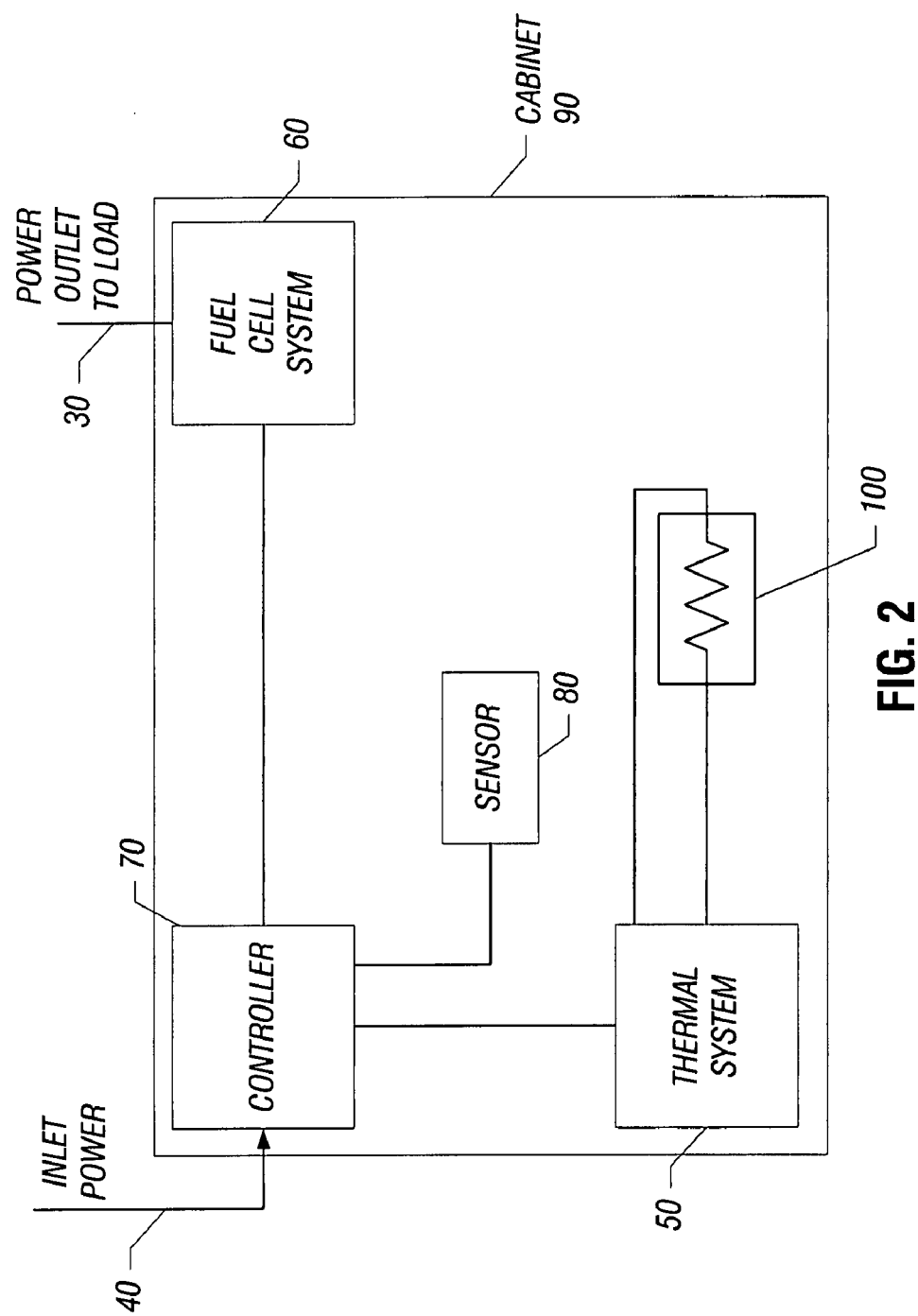
FIG. 2 is a schematic diagram of an embodiment of a system including a fuel cell.

As shown in FIG. 2 power line 40 energizes controller 70, which provides available power for thermal system 50 and allows communication with a master controller (not shown). A sensor 80 is located within cabinet 90 and monitors the internal temperature of the cabinet and relays that information to controller 70. Alternatively sensor 80 may be placed on or in fuel cell system 60 to monitor the temperature of various components and/or fluid streams. When the temperature falls below a predetermined threshold, controller 70 sends a signal to thermal system 50 thereby enabling the system to provide heat into the cabinet via heater 100 or directly to fuel cell system 60 as described herein. Heater 100 may be a resistive heater located within a coolant supply loop that circulates throughout cabinet 90. Preferably an immersion heater is located directly within the coolant line and provides the heat necessary to raise the temperature level of the system to the predetermined level. Alternatively, heater 100 may be an electrical heater located within cabinet 90 adapted to heat the atmosphere within the cabinet or any type of heater capable of raising and maintaining the interior temperature of cabinet 90.

Figure 3:
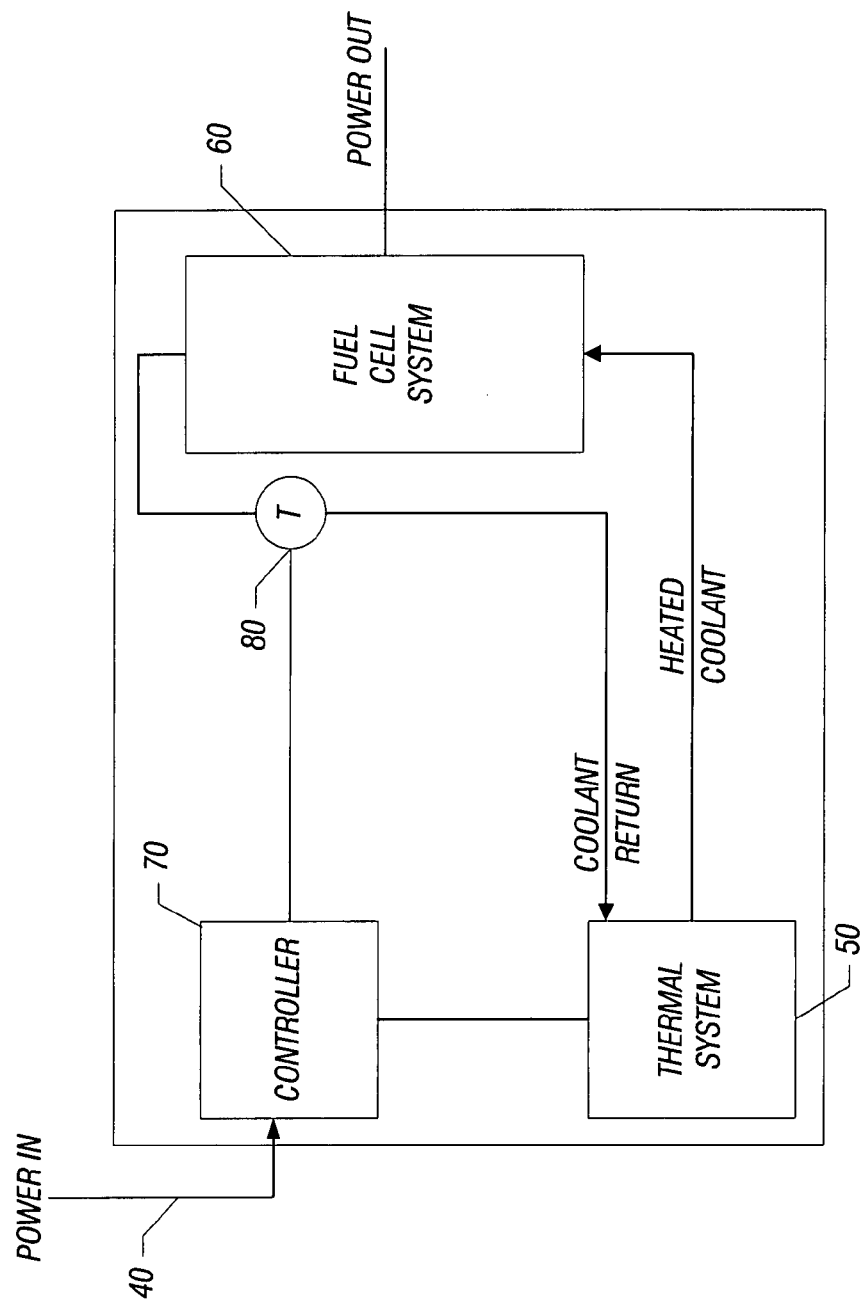
FIG. 3 is a schematic diagram of an embodiment of a system including a fuel cell.

FIG. 3 illustrates an alternate embodiment, whereby controller 70 activates thermal system 50 when temperature sensor 80 indicates that the temperature of the coolant return has fallen outside a predetermined threshold. In this embodiment, heated coolant (such as glycol, Therminol™, de-ionized water, or other commonly used coolants) is circulated from thermal system 50 through fuel cell system 60. Sensor 80 monitors the temperature of the coolant return and signals controller 70 when the temperature has exceeded the predetermined limits. Controller 70 shuts off thermal system 50 when the temperature is warm enough, and starts up the system when the temperature drops below the limits.

Figure 4:
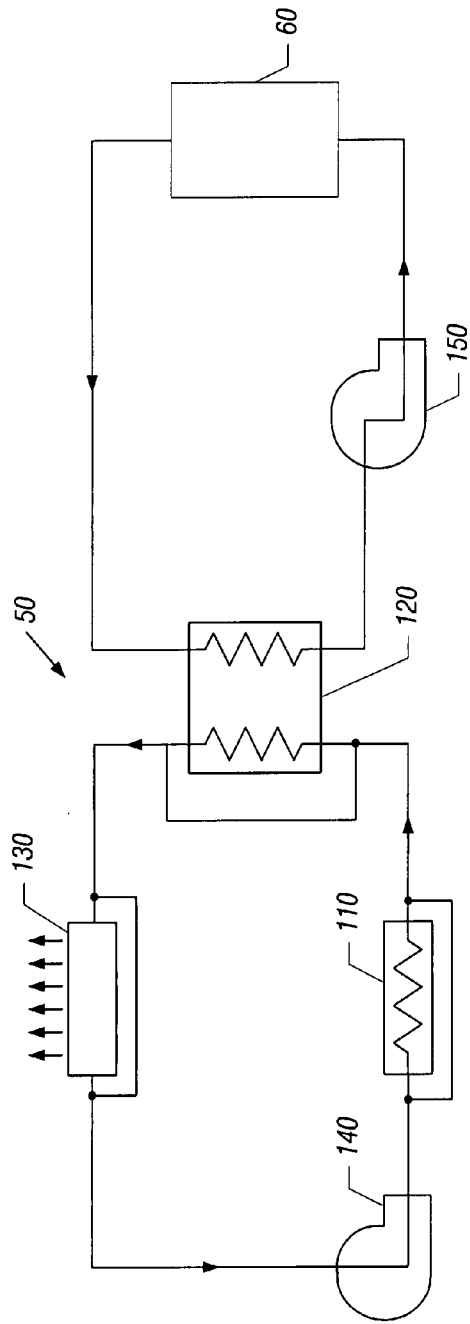
FIG. 4 is a schematic diagram of an embodiment of a system including a fuel cell.

One embodiment of thermal system 50 is shown in FIG. 4. Thermal system 50 may comprise a heater 110, a heat exchanger 120, a radiator 130, and a coolant pump 140. Each of these devices may have a bypass loop which allows the system to bypass any of these elements based on sensor (not shown) readings taken during operation. Heat exchange between thermal system 50 and fuel cell system 60 may take place using various methods. One embodiment, as shown in FIG. 4, utilizes a second coolant loop interfacing with heat exchanger 120 and fuel cell system 60. A coolant pump 150 moves the cooling fluid through the second coolant loop. Alternatively, a single coolant loop may be used, with the coolant flowing from heater 110 into fuel cell system 60.

Figure 5:
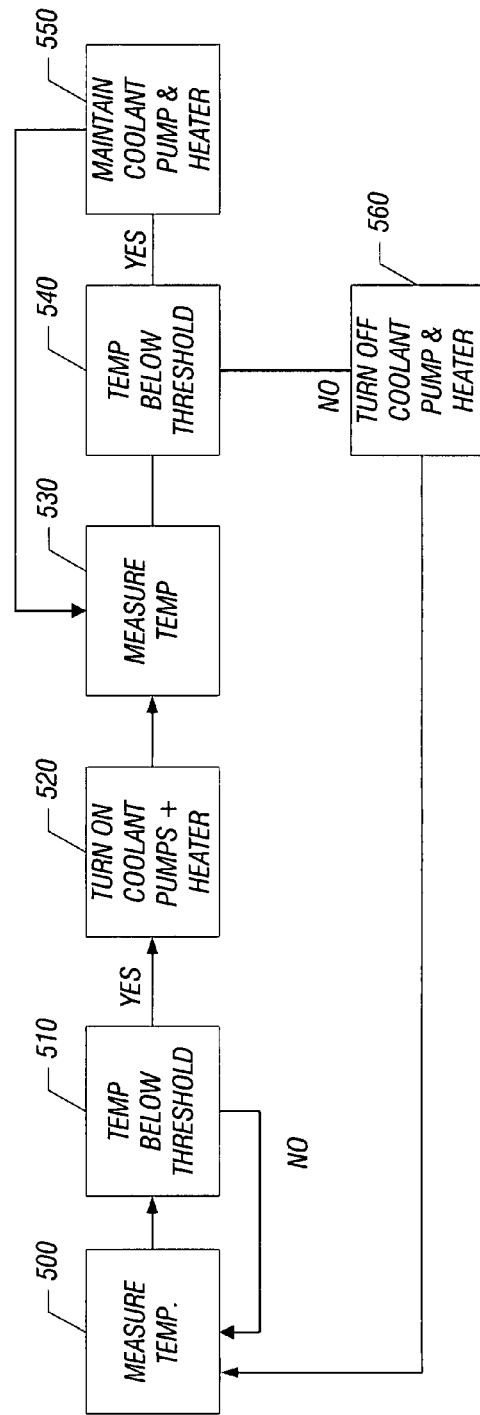
FIG. 5 is a flowchart of a logic set for performing one aspect of the present invention.

FIG. 5 depicts a flowchart containing one set of logic steps, which enables the performance of the thermal management system described herein. The logic may be contained on controller 70, and embody at least one program storage device readable by a machine, tangibly embodying at least one program of instructions executable by the machine to perform a method of managing the thermal system of a fuel cell system.

Step 500 comprises obtaining a sensor reading (such as sensor 80 in FIG. 2), and providing that information to controller 70. In step 510 the controller determines if the temperature below a predetermined threshold. Examples of such a threshold may be a low-end temperature of between 3-15 degrees Celsius with a preferred range of 5-8 degrees and a high-end temperature of 15-20 degrees Celsius. Temperatures within this range will keep the system above the freezing point, while minimizing the energy draw from the primary power source. It may also be desired to maintain the system at operating temperature, which may be in the range of 50-75 degrees Celsius (for a PEM system) to minimize start-up time.

If it is determined that the temperature is below the threshold then the controller turns on the coolant pump(s) and coolant heater, as shown in step 520. This begins the circulation of heated coolant throughout the system. If it is determined that the temperature is not below the predetermined threshold, then the process begins again at step 500. Once heated coolant begins circulating the sensor relays new temperature information as shown in step 530. If it is determined in step 540 that the temperature is below the high-end threshold than the system continues to operate (step 550). However if the temperature is above the high-end threshold then a signal is sent from controller 70 to turn off the coolant pump(s) and heater (step 560), and the process begins again from step 500.

In an embodiment of the invention, a thermal protection system for a fuel cell backup power generator includes an enclosure, a temperature sensor, a heater and a control circuit. The enclosure houses a fuel cell and a coolant circuit. The coolant circuit is coupled to the fuel cell. The temperature sensor is adapted to indicate a system temperature, and the heater is adapted to increase the system temperature when actuated. The control circuit is adapted to actuate the heater when the system temperature is below a predetermined threshold. The temperature sensor may be a first temperature sensor such that when the system temperature is a first temperature, the control circuit is adapted to actuate the heater when the system temperature is below a first predetermined threshold. The control circuit is also adapted to actuate a pump to circulate a coolant through the coolant circuit when a second temperature of a second temperature sensor is below a second predetermined threshold. The first predetermined threshold is different from the second predetermined threshold, in accordance with some embodiments of the invention.

While the invention has been disclosed with respect to a limited number of embodiments, those skilled in the art, having the benefit of this disclosure, will appreciate numerous modifications and variations therefrom. It is intended that the invention covers all such modifications and variations as fall within the true spirit and scope of the invention.

What is claimed is:

1. A thermal protection system for a fuel cell backup power generator, comprising:
   an enclosure housing a fuel cell and a coolant circuit, wherein the coolant circuit is coupled to the fuel cell;
   a temperature sensor adapted to indicate a system temperature;
   a heater located in an atmosphere of the enclosure and adapted to heat the atmosphere to increase the system temperature when actuated to raise and maintain the atmosphere of the enclosure to a predetermined level; and
   a control circuit adapted to actuate the heater when the system temperature is below a predetermined threshold to regulate the atmosphere of the enclosure at the predetermined level.

2. The system of claim 1, wherein the fuel cell comprises a PEM fuel cell.

3. The system of claim 1, wherein the coolant circuit includes a coolant having a freezing temperature below the freezing temperature of water.

4. The system of claim 1, further comprising a primary power supply adapted to provide power to the heater when the heater is actuated.

5. The system of claim 4, wherein the primary power supply comprises a utility power grid.

6. The system of claim 1, wherein the predetermined threshold is in the range of 0 to 15° C.

7. The system of claim 1, wherein the temperature sensor is located in an atmosphere of the enclosure.

8. The system of claim 1, wherein the temperature sensor is located on the fuel cell.

9. The system of claim 1, wherein the heater comprises an electric resistive heater.

10. The system of claim 1, wherein the heater comprises a burner coupled to a combustible fuel supply.

11. The system of claim 1, wherein the control circuit comprises a thermostat.

12. The system of claim 1, further comprising a primary power supply coupled to a pump, wherein the pump is adapted to circulate a coolant in the coolant circuit.

13. The system of claim 1, wherein the control circuit is adapted to, actuate the heater when the system temperature is below a first predetermined threshold, and wherein the control circuit is adapted to actuate a pump to circulate the coolant through the coolant circuit when the temperature is below a second predetermined threshold.

14. The system of claim 1, wherein the temperature sensor is a first temperature sensor, wherein the system temperature is a first temperature, wherein the control circuit is adapted to actuate the heater when the system temperature is below a first predetermined threshold, and wherein the control circuit is adapted to actuate a pump to circulate a coolant through the coolant circuit when a second temperature of a second temperature sensor is below a second predetermined threshold.

15. The system of claim 14, wherein the second temperature sensor is located in the coolant circuit, and wherein the first temperature sensor is located external to the coolant circuit.

16. A system comprising:

an enclosure housing a fuel cell and a coolant circuit, wherein the coolant circuit is coupled to the fuel cell;

a first temperature sensor adapted to indicate a system temperature;

a heater located in an atmosphere of the enclosure, the heater adapted to increase the system temperature when actuated; and a control circuit adapted to:

actuate the heater when the system temperature is below a first predetermined threshold, and actuate a pump to circulate a coolant through the coolant circuit when a second temperature of a second temperature sensor is below a second predetermined threshold, the first predetermined threshold being different from the second predetermined threshold.

17. The system of claim 16, wherein the fuel cell comprises a PEM fuel cell.

18. The system of claim 16, wherein the coolant circuit includes a coolant having a freezing temperature below the freezing temperature of water.

19. The system of claim 16, further comprising a primary power supply adapted to provide power to the heater when the hearer is actuated.

20. The system of claim 19, wherein the primary power supply comprises a utility power grid.

21. The system of claim 16, wherein the predetermined threshold is in the range of 0 to 15° C.

* * * * *

UNITED STATES PATENT AND TRADEMARK OFFICE
CERTIFICATE OF CORRECTION

| | | |
|---|---|---|
| PATENT NO. | : 7,264,895 B2 | Page 1 of 1 |
| APPLICATION NO. | : 10/265025 | |
| DATED | : September 4, 2007 | |
| INVENTOR(S) | : Eric T. White | |

It is certified that error appears in the above-identified patent and that said Letters Patent is hereby corrected as shown below:

Column 8:
Line 27, "the hearer is actuated" should be --the heater is actuated--.

Signed and Sealed this

Twentieth Day of November, 2007

JON W. DUDAS
*Director of the United States Patent and Trademark Office*